United States Patent [19]

Kaufmann et al.

[11] Patent Number: 5,069,122
[45] Date of Patent: Dec. 3, 1991

[54] THERMAL MARKING DEVICE FOR WEBS OF MINERAL WOOL AND A METHOD OF APPLYING THE MARKINGS

[75] Inventors: Friedrich Kaufmann, Limburgerhof; Horst-Werner Schlossherr, Dudenhofen; Egon Zinn, Meckenheim, all of Fed. Rep. of Germany

[73] Assignee: Isover Saint-Gobain, Courbevoie, France

[21] Appl. No.: 492,493

[22] Filed: Mar. 12, 1990

[30] Foreign Application Priority Data

Mar. 13, 1989 [DE] Fed. Rep. of Germany ....... 3908128

[51] Int. Cl.$^5$ .............................................. B44B 5/02
[52] U.S. Cl. ........................................ 101/9; 101/31; 101/109; 101/25
[58] Field of Search .................. 101/109, 8, 9, 21, 25, 101/27, 31; 219/216 PH; 346/76 PH; 400/120 MT; 156/581, 582

[56] References Cited

U.S. PATENT DOCUMENTS

| | | | |
|---|---|---|---|
| 1,710,340 | 4/1929 | Bresson et al. | 101/31 |
| 1,731,651 | 10/1929 | Denhof | 101/9 |
| 3,064,563 | 11/1962 | Cook | 219/216 |
| 3,269,304 | 8/1966 | Godfrey | 101/27 |
| 3,961,575 | 6/1976 | Rodabaugh | 101/9 |
| 4,380,446 | 4/1983 | Dickson et al. | 493/11 |
| 4,453,468 | 6/1984 | Shenohn | 101/27 |

FOREIGN PATENT DOCUMENTS 0193376 11/1982 Japan .......................... 400/120 MT
0024472 2/1986 Japan .......................... 400/120 MT Primary Examiner—Edgar S. Burr
Assistant Examiner—Ren Yan
Attorney, Agent, or Firm—Oblon, Spivak, McClelland, Maier & Neustadt

[57] ABSTRACT

A thermal marking device for surfaces of binder-containing webs of mineral wool includes, mounted on a raisable and lowerable mounting frame, a roller which has on its periphery electrically heatable marking elements. The marking elements carry image panels, the marking sections of which take the form of letters, symbols, pictorial represenations etc. and project at least 5 mm beyond the surface of the image panel. Furthermore, the envelope curve of the surface of the marking sections corresponds substantially to the outer surface of an annular cylinder, the axis of which coincides with the axis with the axis of the roller. Furthermore, the marking device is equipped with heating elements, the heating output from which can be locally and variously adjusted. As a result, it is possible to produce homogeneous marked patterns by a suitably reduced or increased supply of energy at locations having need for heat output while creating non-homogeneous decomposition patterns. The intensity of decomposition is thereby graded. Both possibilities can be used to produce a pictorial representation or an inscription or other identification on the surface of a web of mineral wool which contains binder.

12 Claims, 3 Drawing Sheets

THERMAL MARKING DEVICE FOR WEBS OF MINERAL WOOL AND A METHOD OF APPLYING THE MARKINGS

BACKGROUND OF THE INVENTION

1. Field of the Invention

The invention relates to a thermal marking device for marking surfaces of webs of mineral wool which contain a binder.

2. Background of the Related Art

Such a device is known for example from DE-OS 37 13 108. In this publication a device is described which applies to the surface of a web of mineral wool markings which extend transversely to the longitudinal direction or run of the web. For this purpose, the device comprises a roller having on its periphery heated bars, the form and disposition of which correspond to the markings which are to be applied. The roller is rotated at such a speed that the heated bars which are constructed as marking bars roll their plane surface, which lies tangentially to the axis of the roller, over the surface of the web of mineral wool. The bar-like marking sections consist of metal and are heated electrically to such a temperature that upon contact with the surface of the web of mineral wool a flat zone of decomposition is created which corresponds to the contours of the marking bars and in which the binder in the mineral wool web decomposes and, by becoming discolored, forms an optically visible marking image in the form of a line.

However, if the length of the marking bars extends over a relatively large area of the mineral wool web, problems arise with regard to heat expansion. For this reason, the displacement of the bar-like marking elements in a longitudinal direction is limited. This avoids the heat expansion from the marking elements causing the marking bars to be deformed since the displacement path is restricted, but by reason of bulging or the like and therefore irregular action of heat, inaccuracies can occur in the marking pattern applied to the web of mineral wool.

The marking image which is created by the device according to DE-OS 37 13 108 represents an interrupted line or what may be referred to as a broken line. To form markings other than short axially parallel lines, a heating bar with its marking bar can be bent to suit the desired marking. However, in addition to excessive penetration of the outer edges of the marking bars into the surface of the mineral wool web, and thus localized overheating and fuzzy outlines to the marking, this can result in excessive structural complication and the need to provide minimum gaps, e.g. gaps between the letters in the case of inscriptions. Designs which are more complex and which contain intersecting lines, on the other hand, especially by reason of the concentrated supply of heat to the intersections and the resultant excessive temperature, can result in increased action of heat on the binder, resulting in at least partially illegible markings, and the entire marking device being subject to constant mechanical stress due to differing heat expansion, so that a high rate of wear and tear on the parts affected must be anticipated.

SUMMARY OF THE INVENTION

It is an object of the present invention to provide a device which makes it possible to apply even relatively complex designs involving accumulations of lines, such as intersections, to a surface of a mineral wool web without causing overheating.

The above, and other objects are achieved according to the present invention by a thermal marking device for marking binder containing webs of mineral wool. The thermal marking device includes a roller rotatable about an axis, as well as at least one marking element mounted on the roller. Each marking element includes an image panel and a plurality of marking sections projecting from the image panel by at least 5 mm. The marking sections are configured in a pattern corresponding to at least a portion of the image to be marked on the webs. An envelope curve of the marking sections substantially corresponds to the peripheral surface of an imaginary cylinder centered on the roller axis. Means are provided for heating each of the marking elements.

By reason of the fact that the marking elements carry image panels, the marking sections of which preferably project by at least 5 mm beyond the surface of the image panels, it is guaranteed that only the marking sections become imprinted into the surface of the mineral wool without the image panel itself coming in contact with the surface of the web of mineral wool and so forming a zone of decomposition which would overlap the image imprinted by the marking sections. This arrangement could employ marking sections having intersecting lines because there is only indirect, and thus a uniform, feed of heat energy through the image panel so that no significantly high temperature can occur at the points of intersection.

Furthermore, by virtue of the fact that the envelope curve of the surface of the marking sections is substantially the outer surface of an annular cylinder, the axis of which coincides with the axis of the roller, the marking sections during the rolling process have a uniform effect on the surface of the mineral wool. The result is a clearly marked design, the zones of decomposition of which are clearly distinguished from zones of non-decomposed binder on the surface of the mineral wool.

According to a further feature of the invention, the heating output of the heating elements can be locally and differently adjusted, so that differing quantities of heat can be made available at the surface of the image panel and thus also at the marking sections which produce the actual marking. It is thus possible with such heating elements to form predetermined areas on the surface of the marking sections so that they have at least approximately an isothermal character. As a result, it is in turn possible to obtain a normal "temperature pattern" both on the image panel and also on the marking sections, which is then, by the marking process, converted to a pattern of decomposition of organic binder on the surface of the web of mineral wool.

This opens up a wide range of opportunities of designing the marked image which appears on the mineral wool web.

Since the homogeneity of the decomposition pattern may be disturbed by heat losses from marking sections located in the marginal zone of the image panel in relation to marking sections which lie in the more central area of the image panel, the measure according to a further feature of the invention makes it possible to obtain a degree of homogeneity in the decomposition pattern which is especially advantageous for marked images which take the form of inscriptions.

The homogeneity can also be upset if material accumulates at specific locations in the marking sections, such accumulation then leading to excessive heating, e.g. at the point of intersection of the letters "X" compared with the periphery of the letters "X". Here, then, correspondingly less heat is made available under the periphery of the marking "X", so that the visual quality of the pattern of decomposition increases and a disturbing lack of homogeneity in the intensity of decomposition can be largely avoided.

Furthermore, by virtue of the measure according to another feature of the invention it is also possible to compensate for difference in heat requirement due to the differing construction of the marking section, e.g. a marking section in the form of a "B" compared with a marking section in the form of a dot, because with this arrangement, correspondingly less heat can be made available under the dot than under the "B", so that a marked image is obtained which has approximately the same, in other words a homogeneous, intensity.

According to another feature of the invention, it is possible to produce marked patterns of selective non-homogeneity, which particularly in the case of pictorial representations can, in a controlled situation, produce varying intensities of decomposition of the binder in the web of mineral wool, so making it possible to produce graded degrees of blackness which, roughly speaking, correspond to the degrees of gray in black-and-white photography. This opens up opportunities for graphic configurations of the marked image.

Using heating cartridges as heating elements according to another feature of the invention has the advantage that a wealth of such heating cartridges are available commercially so that, from the point of view of construction, only one bore is needed into which the heating cartridges can be inserted and suitable fixed.

According to yet another feature of the invention the heating cartridges can be easily and inexpensively produced and are furthermore of simple construction. It thus becomes possible to use a plurality of electrically independently heated windings within the heating cartridge, windings which may possibly be separately controlled from outside so that different levels of heat output can be obtained at various locations over the heating cartridge, according to the amount of heat required.

The measures according to yet another feature of the invention ensures that the surface of the marking sections may extend equidistantly from the surface of the image panel so that the height of the marking sections above the overall surface of the image panels can be kept constant, and that the heat expansion of the marking elements does not lead to notable stresses, so that there is either no, or perhaps only very minimal, deformation of the marking elements.

A suitable mounting system is advantageously provided by feature of the invention. For example, a fixing element may be used which takes the form of a bearing journal of trigonal-prismatic form over at least a part of its length. This particular construction ensures that there are only minimal heat losses along the edges of the prism, so that there is virtually no possibility of the marked image being disturbed by heat losses. Furthermore, such heat losses can be reduced if a hard, heat insulating and temperature-resistant material such as zirconium oxide is used for the journal bearing.

A further advantage which resides in the use of zirconium oxide as a material for the bearing, perhaps in a bearing bush, lies in the fact that under working conditions this material has favorable expansion properties. Furthermore, products of decomposition of the binder can have the effect of corroding plain bearings of ordinary metals, whereas zirconium oxide is inert.

The measures according to another feature of the invention provides for repeater control arrangements which are simple and which can be achieved without conversion, in that for example only every second or every "nth" desired marking element is heated so that the spacing and/or the imprint of even consecutive marked images can, as required, be varied with identical and/or different marked images.

The measures according to another feature of the invention provide advantages in the construction of such a thermal marking device by plane surfaces available as the individual surfaces of the polygon for mounting the marking elements while just as many polygonal surfaces exist on the basic roller used as the number of marking elements which have to be applied so that no superfluous space is sacrificed.

Without the need for any conversion, the measures according to yet another feature of the invention corresponding marking designs to various products, which means, for example, that there may be one roller with its own marking elements which is provided for each product. If there is a change in the product which is to be thermally marked, then by the choice of the appropriate heating circuit or, as in the case of a turret head of a microscope, the choice of a special lens to suit a particular need - one specific marking image or roller is selected for a specific design and/or a specific product.

The measures according to another feature have the advantage that by the interaction of at least two marking devices which are synchronized with each other, very complex designs can be applied to the surface of the mineral wool web without the need to construct a relatively large basic roller body for the purpose, which would involve corresponding structural expense.

The measures according to another feature have the advantage that by incorporating a special correction means, it is possible to orient one created marked image within another marked image which extends in synchronism with it, so that particular graphic and/or functional effects are possible.

BRIEF DESCRIPTION OF THE PREFERRED EMBODIMENTS

Further advantages and features of the present invention will emerge from the ensuing description of an example of embodiment and from the accompanying drawings, in which.

DETAILED DESCRIPTION OF THE PREFERRED EMBODIMENT

Figure 1:
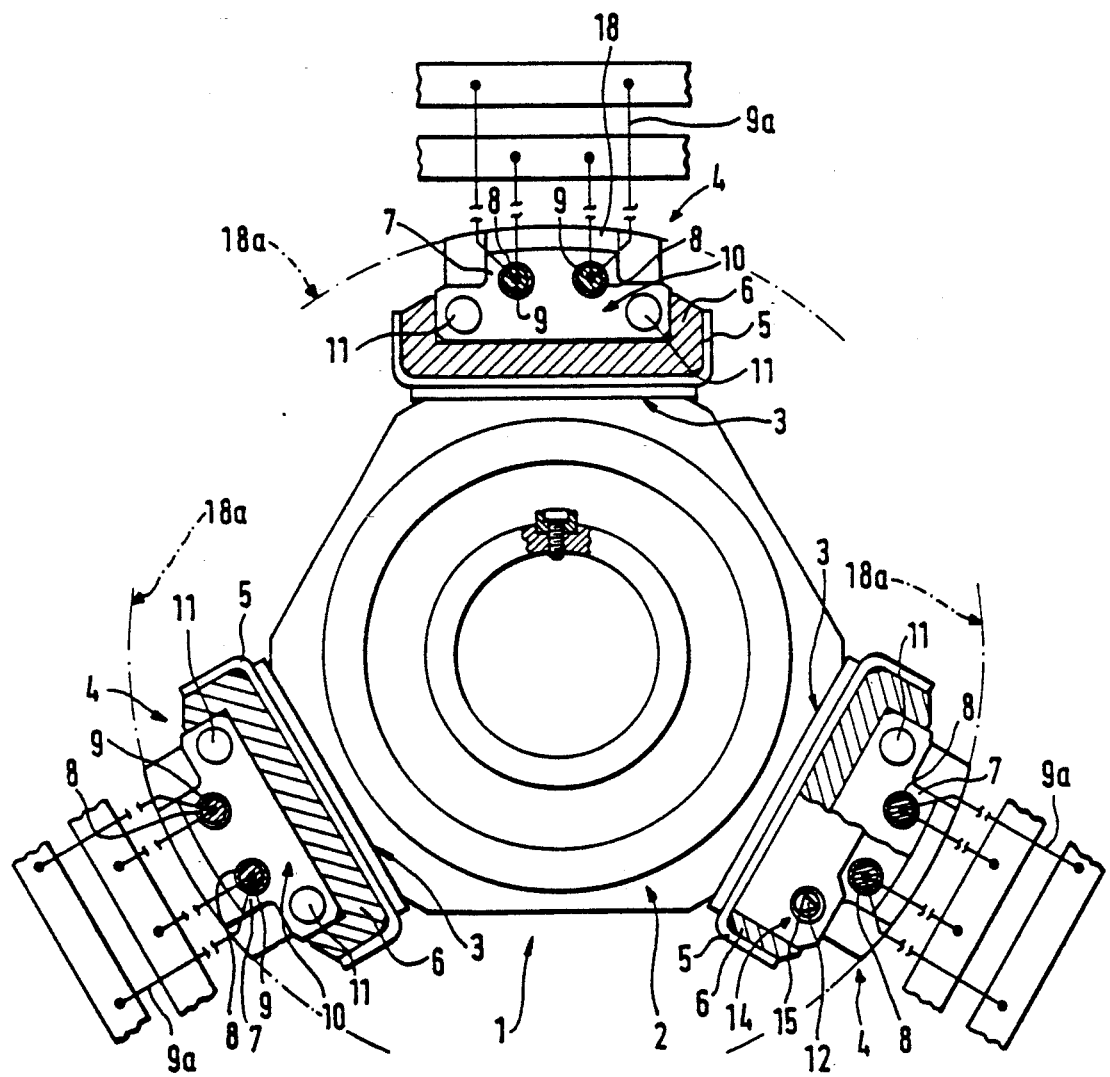
FIG. 1 is a cross-section through a basic roller body according to the invention, with marking elements mounted on it.

FIG. 1 shows a roller 1 of a thermal marking device in which, on a basic roller body 2 having a substantially hexagonal basic surface, a marking element 4 is fixed in a technically known manner on every second large surface 3 of the polygon.

The use of a hexagonal basic surface results in structural simplification, since the marking element 4 can easily be mounted on the large surface 3 of the polygon because this latter is not curved. For details of the mounting, the drive and also of the raising and lowering of a thermal marking device, reference is made DE-OS-37 13 108.

Each marking element 4 consists of a retaining profile 5, a heat insulating block 6 of asbestos substitute and an image panel 7 serving as an inscription strip. The image panel 7 has two adjacently disposed parallel extending upper bores 8 into which are inserted the heating elements 9 which are constructed as heating cartridges supplied with electrical energy via conductors 9a. Furthermore, the image panel 7 has on each of its end faces 10 two lower bores 11 into which partially cross-sectionally polygonal, but in the embodiment shown triangular, fixing elements 12 in the form of bearing journals are immovably engaged. The bearing journals 12 are mounted in bearing blocks 13 by a bore hole 14 of the bearing blocks, within which is inserted a zirconium oxide bearing bush 15. The use of zirconium oxide as a material for the structural element 15 means that only a little heat energy is lost through the element 15, thus virtually excluding any possibility of the marked image being upset by heat losses.

Figure 2:
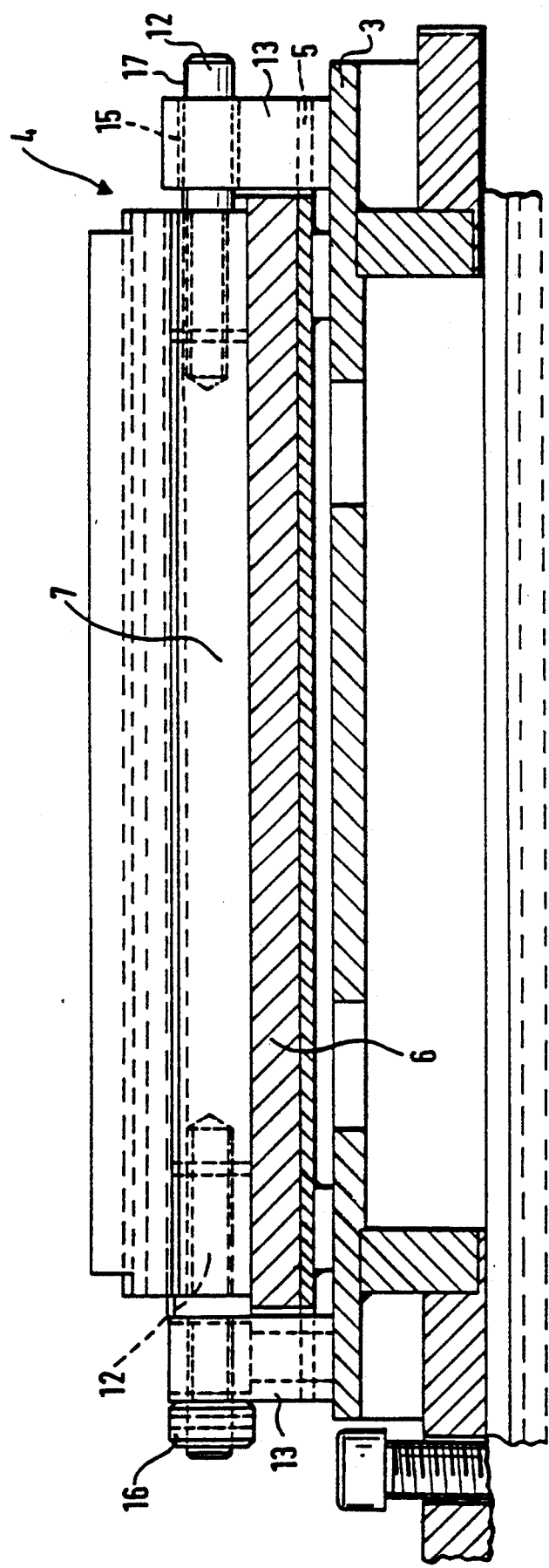
FIG. 2 is a longitudinal section through a marking element according to the invention.

In the embodiment shown in FIG. 2, on the left hand side of the marking element 4, the bearing journal 12 together with the bearing block 13 and an abutment 16 which may be suitably secured on the bearing journal, prevents the displacement of the marking element 4 so that the latter is rigidly clamped on its left hand side. On the other hand, the right hand side of the marking element 4 is so constructed that the bearing journal 12, at its cross-sectionally triangularly constructed part, is mounted for sliding displacement in its bearing bush 15 which is inserted into the bearing block 13 when there is thermal expansion of the marking element 4, so that this latter slides on the edges 17 of the polygonal bearing journal 12. This guarantees that there are no deformations of the image panel 7, serving as an inscription strip, due to the effects of heat.

Figure 3:
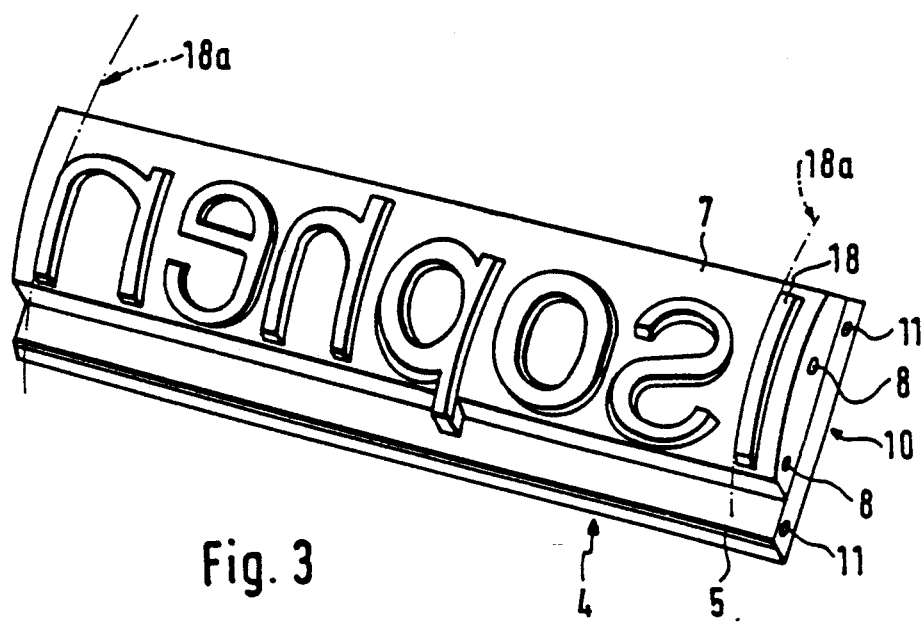
FIG. 3 shows by way of example an embodiment of a marking element according to the invention, in a perspective view.
Figure 4:
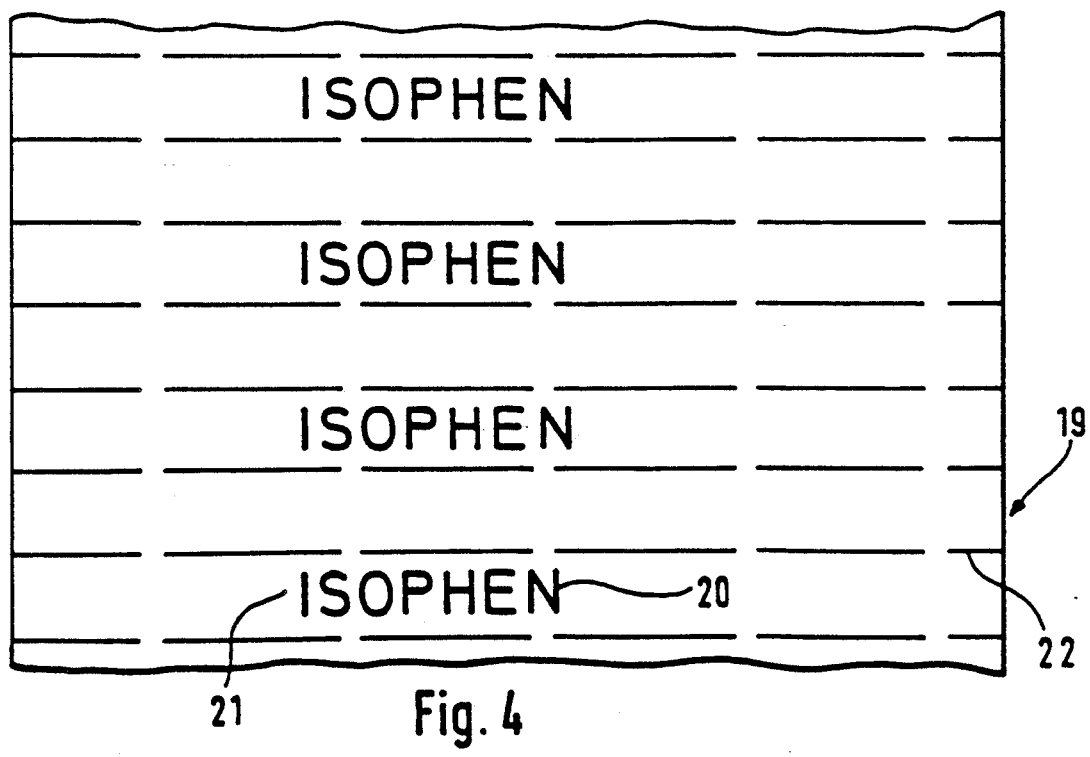
FIG. 4 shows a web of mineral wool with a marked design produced by the marking sections according to the invention.

The marking sections 18 shown in FIG. 3 project 5 mm beyond the surface of the image panel 7 and form an inscription "ISOPHEN" consisting of mirrored-opposite letters. They are so disposed that the envelope curve 18a of their surface is approximately the outer surface of an imaginary annular cylinder, the axis of which coincides with the axis of the roller 1. In operation, the marking sections 18 are at a temperature which is typically around 400° C. This temperature is sufficient to decompose the organic binder in a mineral wool web 19 in the region of the marking sections 18. However, the temperature used may vary as a function of the marking speed and the quality or consistency of the organic binder. The marking sections 18 draw their heat energy from the heating elements 9 which are constructed as heating cartridges.

The basic body 2 of the roller which carries a marking element 4 on every second large surface 3 of its polygon is moved by means of a drive which is not shown in the drawings and the angular speed of the basic roller body 2 is so adapted to the rate of feed of mineral wool web 19 that when the marking sections 18 are pressed onto, and roll over, the surface of the web, regular zones 20 of decomposition in the form of mirrored-opposite inscriptions "ISOPHEN" are produced on the web 19 of mineral wool to form inscriptions 21 in the form of "ISOPHEN". A further possible drive arrangement is one in which the roller 1 is entrained by the forward movement of the mineral wool web 19 due to the marking sections 18 which press into the web 19 of mineral wool.

The decomposition zones 20 are strengthened by the pressure which is applied by the roller 1. The pressure is transmitted to the marking sections 18 which are heated to about 400° C., thus improving the transfer of heat between the readily heat-conductive marking sections 18 and the binder of the mineral wool web 19 so that during the brief time of contact of the marking sections 18 with the mineral wool web 19, a sharply delineated decomposition zone 20 with a minimal depth effect is produced in the form of the inscription 21 "ISOPHEN" which is created in the surface of the mineral wool web 19. The sharp delineation of the decomposition zone 20 is favored by the fact that the marking sections 18 project by about 5 mm beyond the surface of the image panel 7, thus ensuring that only the marking sections 18 are impressed into the surface of the mineral wool web 19 without the image panel 7, which serves as an inscription bar, coming in contact with the surface of the mineral wool web 19, which might otherwise cover over the inscription 21 "ISOPHEN". Furthermore, by reason of the fact that the envelope curve of the surface of the marking sections 18 is at least approximately the outer surface of an annular cylinder, the axis of which coincides with the axis of the roller 1, rolling of the marking elements 4 over the surface of the marking sections 18 on the surface of the mineral wool web 19 produces a uniform action of the marking sections on the surface of the mineral wool web 19, thus further improving the clarity of the delineation of the decomposition zones 20 on the surface of the mineral wool web 19.

By virtue of using marking sections 18 which in their entirety form a mirrored image of a pictorial representation, it is for example possible to transfer pictorial designs to the mineral wool web 19.

Also, heating elements 9 are constructed as heating cartridges, the heating output of which can be varied via the longitudinal extension of the heating elements 9 in order to compensate for different levels of heat loss in different areas of the image panel 7 and thus, at the marking sections 18, to provide either less or more heating output at those places where heat losses occur. As a result, due to the homogeneous decomposition of the organic binder in the mineral wool web 29, homogeneously marked images such as inscription 21 "ISOPHEN" are produced in the web 19 of mineral wool.

However, if it is intended to achieve an intentionally non-homogeneous marked image on the surface of the mineral wool web, then heating elements 9 are used, the heating output of which is so adjusted via their longitudinal extension that at the desired areas of the image panel 7, more or less heat energy is made available so that differing stages of the degree of decomposition are then expressed in a varying darkening of the decomposition zones 20, rather like the graduations of gray of a photographic black-and-white film, so that a marked image of graded areas of blackness is produced on the mineral wool web. It is thus possible to achieve complex marked images with a pictorial effect.

The mineral wool web 19 is preferably of such a type as is explained in DE-OS 37 13 108. It can also have additional marked images 22 which are produced by another thermal marking device. In an unlined mineral wool web 19 with a width of 1200 mm, a nominal thickness of 100 mm and a length of 6 m, the raw density can be assumed to be between 10 and 30 kg/m$^3$ and particularly between 14 and 25 kg/m$^3$. Possible binders are phenol resin in a proportion of 6 to 7% by weight of the dry binder in the product, but in the embodiment, the binder content in terms of phenol resin is 6.6% by weight (dry).

With regard to the properties and possible use of such a mineral wool web 19 and with regard to other details, reference should be made to DE-PS 36 12 858 in its entirety.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermal marking device for marking binder containing webs of mineral wool, comprising:
   a roller rotatable about an axis;
   at least one marking element mounted on said roller, each said marking element including an image panel and a plurality of marking sections projecting from said image panel by at least 5 mm, said marking sections being configured in a pattern corresponding to at least a portion of an image to be marked on the webs, wherein said marking sections define an envelope curve which substantially corresponds to the peripheral surface of an imaginary cylinder centered on said roller axis;
   a heat insulating block mounted to the roller and means for slidably mounting each said at least one marking element on the roller via the heat insulating block; and
   means for heating each said marking element.

2. A thermal marking device according to claim 1 wherein said heating means comprise at least one electrical heating element having an adjustable output.

3. A thermal marking device according to claim 2, including means for adjusting the heat output of said heating element for compensating for different levels of heat losses in different areas of the image panel and marking sections so as to produce a homogeneous marked image.

4. A thermal marking device according to one of the preceding claims 1 or 2, wherein said heating element is a heating cartridge.

5. A thermal marking device according to claims 1 or 2 wherein the image panel substantially lies on the periphery of a circle centered on the roller axis.

6. A thermal marking device according to one of claims 1 or 2 wherein the heating means is provided for each individual marking element or groups thereof.

7. A thermal marking device according to one of claims 1 or 2 wherein said roller has the form of a cylindrical polygon with a plurality of surfaces corresponding in number to a multiple of the number of said marking elements.

8. A thermal marking device according to one of claims 1 or 2 wherein said roller is part of a rotatably mounted overall marking system having a plurality of marked images positioned along the lines of a turret.

9. A thermal marking device according to one of claims 1 or 2 wherein said roller is so synchronized with a further marking device that coincident marked images are produced.

10. A thermal marking device according to claim 9, wherein the roller can be so adjusted by means of a special correcting means in the marking direction that a position of the marked image which is produced can be within a further synchronously extending additional marked image.

11. A method of applying thermal markings to a binder-containing web of mineral wool, comprising the steps of:
    resting a mineral wool web on a moving conveyor belt;
    providing in proximity to the web on the conveyor belt a rigidly disposed roller which has on its periphery at least one preferably electrically heated marking element including an image panel and a plurality of marking sections projecting from said image panel by at least 5 mm, which marking sections substantially correspond to the peripheral surface of an imaginary cylinder centered on the roller axis, at least one of said marking sections being elongate in a circumferential direction of said roller;
    relatively moving said roller and said web so as to uniformly press said sections onto said web and locally heat said web; and
    maintaining said sections pressed on said web long enough to thermally form a mark on said web.

12. A thermal marking device for making binder containing webs of mineral wool, comprising:
    a roller rotatable about an axis;
    at least one marking element mounted on said roller, each said marking element including an image panel and a plurality of marking sections projecting from said image panel by at least 5 mm, said marking sections being configured in a pattern corresponding to at least a portion of an image to be marked on the webs, wherein said marking sections define an envelope curve which substantially corresponds to the peripheral surface of an imaginary cylinder centered on said roller axis;
    fixing elements holding said marking elements and having insulating means for minimizing a transfer of heat energy from the marking element, wherein the fixing elements are at least partially in the form of a polygonal cylinder and the insulating means comprise bushes including zirconium oxide; and
    means for heating each said marking element.

* * * * *